United States Patent
Micanek et al.

(10) Patent No.: US 10,927,698 B2
(45) Date of Patent: Feb. 23, 2021

(54) TURBOCHARGER WITH VARIABLE-NOZZLE CARTRIDGE, INCLUDING RESILIENT HEAT SHIELD ASSEMBLY TO LOCATE THE CARTRIDGE AXIALLY

(71) Applicant: Garrett Transportation I Inc., Torrance, CA (US)

(72) Inventors: Vit Micanek, Brno (CZ); Miroslav Protiva, Brno (CZ); Lucie Kovarova, Brno (CZ)

(73) Assignee: Garrett Transportation I Inc., Torrance, CA (US)

(*) Notice: Subject to any disclaimer, the term of this patent is extended or adjusted under 35 U.S.C. 154(b) by 105 days.

(21) Appl. No.: 16/245,222

(22) Filed: Jan. 10, 2019

(65) Prior Publication Data

US 2020/0224548 A1 Jul. 16, 2020

(51) Int. Cl.
| | | |
|---|---|---|
| *F01D 17/14* | (2006.01) | |
| *F01D 25/14* | (2006.01) | |
| *F02B 37/22* | (2006.01) | |
| *F02C 6/12* | (2006.01) | |
| *F16F 1/32* | (2006.01) | |
| *F04D 29/42* | (2006.01) | |
| *F04B 17/00* | (2006.01) | |

(Continued)

(52) U.S. Cl.
CPC ........... *F01D 17/141* (2013.01); *F01D 17/14* (2013.01); *F01D 25/08* (2013.01); *F01D 25/145* (2013.01);
(Continued)

(58) Field of Classification Search
CPC .......... F01D 25/08; F04D 29/42; F04D 29/08; F04B 17/00
See application file for complete search history.

(56) References Cited

U.S. PATENT DOCUMENTS 3,263,424 A 8/1966 Birmann
5,087,176 A * 2/1992 Wieland .................. F01D 5/025
415/177

(Continued)

FOREIGN PATENT DOCUMENTS

DE 202005009491 U1 9/2005
EP 1672177 A1 6/2006
(Continued)

OTHER PUBLICATIONS

Extended European Search Report in EP Appl. No. 19207597.6-1004, dated May 6, 2020.

*Primary Examiner* — J. Todd Newton
*Assistant Examiner* — Andrew J Marien
(74) *Attorney, Agent, or Firm* — John C. James (57) ABSTRACT

A turbocharger includes a variable-nozzle cartridge having a nozzle ring that supports an array of variable vanes in the turbine nozzle. A heat shroud and spring assembly is disposed in a space bounded between the turbine wheel, the nozzle ring, and the center bearing housing of the turbocharger. The heat shroud and spring assembly includes discretely formed heat shroud and spring components configured as annular non-planar disk-shaped parts. The heat shroud and spring are in contact with each other at their radially inner and radially outer peripheral regions, but are spaced apart between those peripheral regions, thereby creating a sealed-off dead space between them. The dead space can significantly reduce the maximum temperature of the spring, relative to arrangements having a single shroud or having dual shrouds with no dead space between them.

7 Claims, 4 Drawing Sheets

(51) Int. Cl.
 *F04D 29/08* (2006.01)
 *F01D 25/08* (2006.01)
 *F04D 25/08* (2006.01)

(52) U.S. Cl.
 CPC .............. *F02B 37/225* (2013.01); *F02C 6/12* (2013.01); *F04B 17/00* (2013.01); *F04D 25/08* (2013.01); *F04D 29/08* (2013.01); *F04D 29/42* (2013.01); *F16F 1/32* (2013.01); *F05D 2220/40* (2013.01); *F05D 2240/70* (2013.01); *F05D 2260/231* (2013.01)

(56) References Cited

U.S. PATENT DOCUMENTS

| | | | |
|---|---|---|---|
| 7,600,969 B2 * | 10/2009 | Frankenstein | F01D 17/16 |
| | | | 267/151 |
| 8,322,979 B2 | 12/2012 | Walter et al. | |
| 10,415,462 B2 * | 9/2019 | Gerard | F04D 17/10 |
| 2008/0304957 A1 * | 12/2008 | Walter | F02C 6/12 |
| | | | 415/159 |
| 2009/0060737 A1 * | 3/2009 | Frankenstein | F16F 1/32 |
| | | | 415/229 |
| 2012/0237343 A1 * | 9/2012 | Matsuyama | F02C 7/28 |
| | | | 415/182.1 |
| 2017/0298761 A1 * | 10/2017 | Williams | F01D 25/24 |
| 2018/0100429 A1 * | 4/2018 | Masa | F01D 17/162 |
| 2018/0252160 A1 * | 9/2018 | Hoecker | F01D 25/16 |
| 2020/0131926 A1 * | 4/2020 | Bolbolan | F01D 17/165 |

FOREIGN PATENT DOCUMENTS

| | | |
|---|---|---|
| EP | 2143910 B1 | 3/2012 |
| EP | 3309365 A1 | 4/2018 |

* cited by examiner

TURBOCHARGER WITH VARIABLE-NOZZLE CARTRIDGE, INCLUDING RESILIENT HEAT SHIELD ASSEMBLY TO LOCATE THE CARTRIDGE AXIALLY

BACKGROUND OF THE INVENTION

This application relates generally to turbochargers for internal combustion engines, and relates more particularly to exhaust gas-driven turbochargers having a variable turbine nozzle that includes variable vanes for regulating exhaust gas flow to the turbine wheel.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is a center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

Applicant is owner of a number of patents relating to turbocharger having a variable-nozzle mechanism in the form of a cartridge comprising a pre-assembled unit that is installed into the turbocharger between the turbine housing and the center housing. The cartridge includes a nozzle ring that forms one wall of the nozzle and that supports the array of variable vanes within the nozzle, and an insert that is connected by spacers to the nozzle ring and that forms the opposite wall of the nozzle, the vanes extending between the nozzle ring and the insert.

A challenge with such cartridge-style variable nozzles is properly locating the cartridge both radially and axially relative to the turbine wheel, as well as ensuring that the cartridge stays properly located for the life of the turbocharger. The high-temperature environment within which the variable-nozzle cartridge must operate causes thermal distortion of the various parts of the turbine and variable nozzle, and can also cause creep and/or plasticization of some parts exposed to the highest temperatures. In particular, components such as the disk spring between the turbine wheel and center housing, which axially biases the cartridge so as to stay in the correct axial location, can be susceptible to such detrimental effects caused by extreme temperatures. In particular, the spring can lose its ability to apply the proper axial biasing force to the cartridge, allowing the cartridge to move from its correct location.

The present application concerns ways to mitigate issues such as creep and/or plasticization of the spring and other components within a turbocharger having a variable-nozzle assembly.

SUMMARY OF THE DISCLOSURE

The present disclosure relates to turbochargers having a variable turbine nozzle in the form of a cartridge as noted. In accordance with one embodiment of the invention described herein, a turbocharger of this type includes a nozzle ring whose radially inner periphery defines a radial reference surface that faces radially inwardly and opposes a radial reference surface of the center housing. The nozzle ring also defines an axial reference surface that faces axially away from the turbine wheel. An insert defining a nozzle portion is axially spaced from the nozzle ring such that the vanes extend between the nozzle ring and the nozzle portion, and a plurality of spacers are connected between the nozzle portion of the insert and the nozzle ring. The turbocharger further comprises a heat shroud and spring assembly disposed in a space bounded between the radially inner periphery of the nozzle ring, the turbine wheel, and the center housing. The heat shroud and spring assembly comprises a heat shroud and a spring formed as two discrete parts, the heat shroud comprising an annular non-flat disk-shaped part and the spring comprising an annular non-flat disk-shaped part. The heat shroud and the spring are abutting each other at radially outer and radially inner peripheral regions thereof and are spaced apart over an intermediate region between said radially inner and radially outer peripheral regions so as to define a dead space between the heat shroud and the spring that is sealed off from exhaust gases surrounding the heat shroud and spring assembly.

Computer thermal analyses of an embodiment of the turbocharger according to the invention indicate a significant reduction in temperature of the spring relative to prior-art shroud arrangements, both single-shroud designs as well as dual-shroud assemblies with no dead space between the two shrouds.

In one embodiment, the heat shroud at the radially outer peripheral region thereof is in contact with the axial reference surface of the nozzle ring, and the spring at the radially inner peripheral region thereof is in contact with the axial reference surface of the center housing. The heat shroud and spring assembly is axially compressed between the axial reference surface of the nozzle ring and the axial reference surface of the center housing so as to axially locate the nozzle ring relative to the center housing.

The turbocharger in accordance with embodiments of the invention can further comprise a locator disposed between and in contact with the radial reference surface of the nozzle ring and the radial reference surface of the center housing so as to radially locate the nozzle ring relative to the center housing.

In some embodiments, the heat shroud can be constructed of a first material and the spring can be constructed of a second material that differs from the first material. However, in other embodiments, the heat shroud and the spring can be constructed of the same material.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. Terms such as "axial", "radial", and "circumferential" as used herein are with respect to the rotational axis of the turbocharger.

Figure 1:
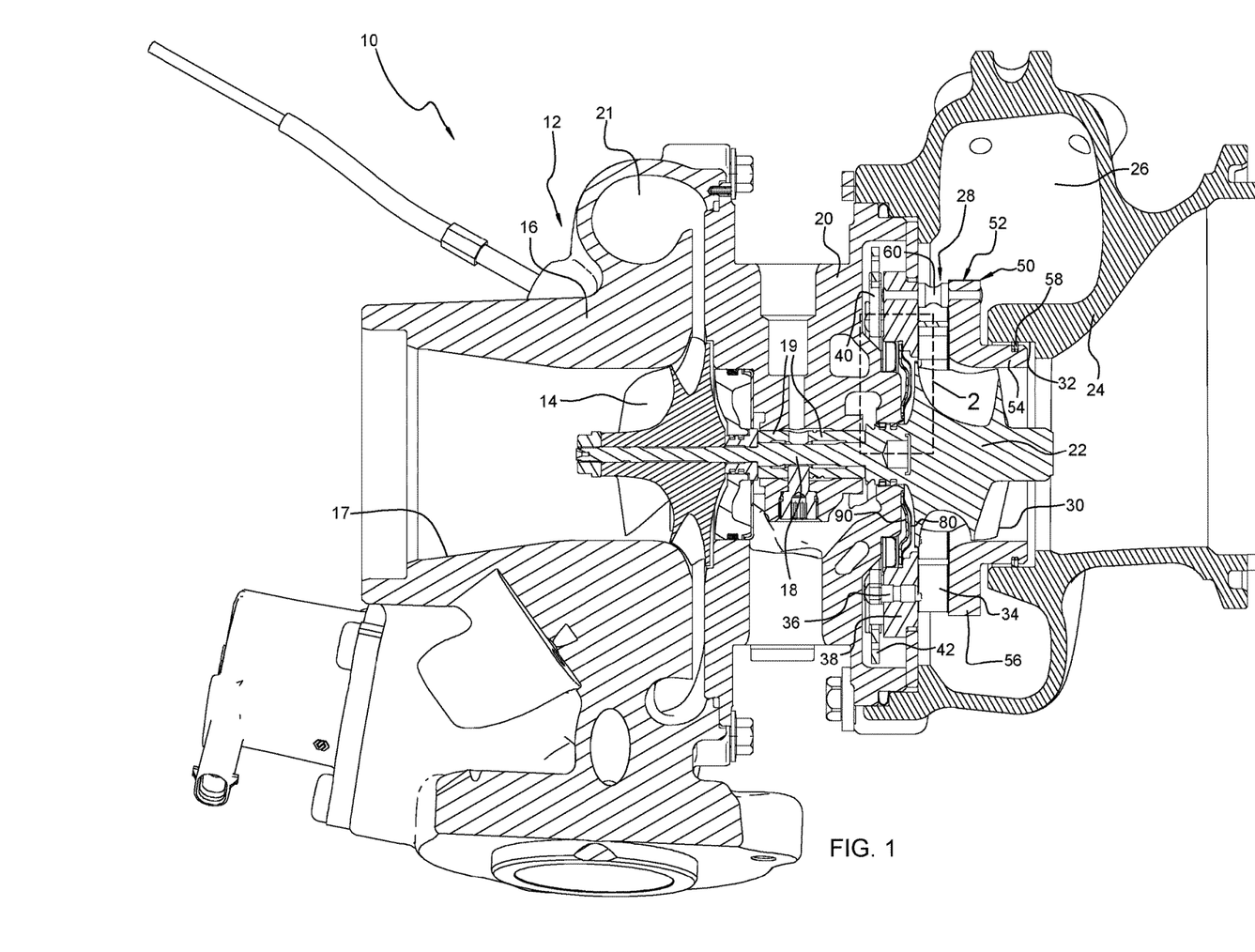
FIG. 1 is an axial cross-sectional view of a turbocharger in accordance with an embodiment of the invention.

A turbocharger 10 in accordance with one embodiment of the invention is illustrated in axial cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air into a volute 21, from which the air is then fed to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to a pin 36 that passes through an aperture in a generally annular nozzle ring 38 that is mounted coaxially with respect to the turbine wheel 22. Each pin 36 is rotatable about its axis within the associated aperture in the nozzle ring so that the vane can rotate about the axis for varying the setting angle of the vane. The nozzle ring 38 forms one wall of the flow passage of the nozzle 28. Each of the pins 36 has a vane arm 40 affixed to an end of the pin that protrudes out from the nozzle ring 38, and is engaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to adjust the vane setting angles and thereby vary the cross-sectional flow area through the nozzle 28.

The variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The radially outer surface of the tubular portion 54 has at least one circumferential groove in which at least one sealing ring 58 is retained for sealingly engaging the inner surface of the bore 32. Advantageously, the outer diameter of the tubular portion 54 of the insert is slightly less than the inner diameter of the bore 32 so that a slight gap is defined therebetween, and only the sealing ring(s) 58 make contact with the inner surface of the bore 32. Additionally, there is a gap between the nozzle portion 56 and the adjacent end of the turbine housing at the end of the bore 32. In this manner, the insert 52 is mechanically and thermally decoupled from the turbine housing 24.

A plurality of spacers 60 are connected between the nozzle portion 56 of the insert 52 and the nozzle ring 38 for securing the nozzle ring to the insert and maintaining the desired axial spacing between the nozzle portion of the insert and the nozzle ring. Each spacer passes through an aperture in the nozzle portion 56 and has an enlarged head on the side of the nozzle portion 56 that faces away from the nozzle 28. Each spacer also has a pair of enlarged shoulders axially spaced along the length of the spacer such that one shoulder abuts the opposite side of the nozzle portion 56 and the other shoulder abuts the facing surface of the nozzle ring 38, thereby setting the axial spacing between the nozzle ring and nozzle portion. An end portion of each spacer passes through an aperture in the nozzle ring 38 and the distal end of this end portion is upset to form an enlarged head to capture the nozzle ring. Advantageously, the spacers are formed of a material having good high-temperature mechanical properties and a relatively low thermal conductivity, so that the nozzle ring 38 and insert 52 are effectively thermally decoupled from each other.

Figure 2:
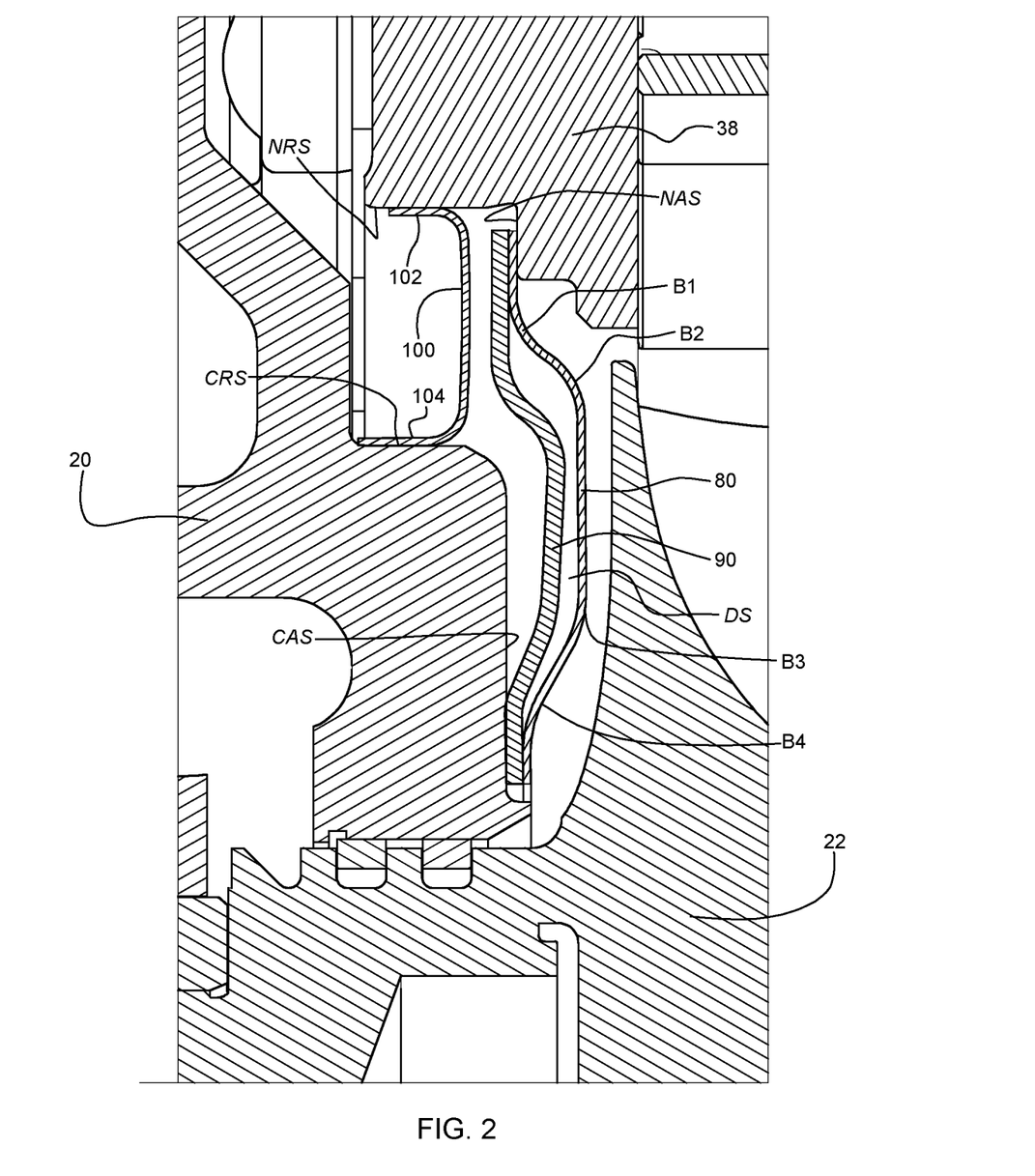
FIG. 2 is a magnified portion of FIG. 1.

With reference to FIG. 2, at the radially inner periphery of the nozzle ring 38, the nozzle ring defines two surfaces that are used as reference surfaces to set the axial and radial location of the nozzle ring (and hence the entire cartridge 50): a radial reference surface NRS is defined facing radially inwardly, and an axial reference surface NAS is defined facing axially away from the turbine wheel 22 and toward the center housing 20. Similarly, the center housing 20 defines two reference surfaces: a radial reference surface CRS is defined facing radially outwardly toward (and radially spaced from) the radial reference surface NRS of the nozzle ring, and an axial reference surface CAS is defined facing axially toward the turbine wheel 22.

Radial locating of the nozzle ring 38 in the illustrated embodiment is accomplished by a locator 100 comprising a ring having a C-shaped cross-section in an axial-radial plane. The locator has two radially spaced legs that extend axially, with a radially extending web connected between them, thus forming the C-shaped cross-section. The radially outer leg 102 engages the nozzle ring's radial reference surface NRS, and the radially inner leg 104 engages the center housing's radial reference surface CRS, thereby locating the nozzle ring 38 radially with respect to the center housing 20. The locator 100 is configured to be flexible and resilient, and to that end it can be constructed from a suitable metal whose material properties are suitable for operation in the high-temperature environment of the turbocharger turbine, where engine exhaust gas temperatures can reach or exceed 950° C.

In the prior art, axial and radial locating of the nozzle ring 38 within the turbocharger has been accomplished in various ways. One approach that has been employed by Applicant and others is to use an annular disk-shaped heat shield or shroud disposed between the center housing 20 and the nozzle ring 38 to axially located the nozzle ring as well as to shield the center housing from the extremely high-temperature exhaust gases passing through the nozzle and turbine wheel, and to use a locator adjacent to the heat shield for radially locating the nozzle ring, such as described in commonly owned U.S. Pat. No. 7,559,199 (the entire disclosure of which is hereby incorporated herein by reference). Applicant's experience has been that this approach is viable as long as engine exhaust gas temperatures do not exceed about 950° C. However, current engine developments are pushing toward engine exhaust gas temperatures as high as 1050° C. Using the same materials for the heat shield and locator as have been used in the past, Applicant has found that the higher exhaust gas temperatures cause creep and plasticization of the heat shroud and/or locator, whereby they lose their ability to hold the nozzle ring in the correct location. This can cause wheel rubbing.

In accordance with the present invention, the conventional materials used in the past can still be used for the heat shroud and locator, while avoiding the creep and plasticization problems that have plagued the prior-art turbocharger designs. As shown in FIG. 2, the present invention employs a heat shroud and spring assembly disposed in a space bounded between the radially inner periphery of the nozzle ring, the turbine wheel, and the center housing. The assembly comprises a heat shroud 80 and a spring 90. The heat shroud 80 comprises an annular disk-shaped part that has a series of bends so that the part is non-flat, which shape increases the stiffness of the heat shroud under axial compression loads. At the radially outer periphery of the heat shroud, the axially facing surface of the heat shroud that faces toward the turbine is in contact with the axial reference surface NAS of the nozzle ring 38. The spring 90 comprises an annular disk-shaped part that has a series of bends so that the part is non-flat for increased axial stiffness, similar to the heat shroud.

At the radially outer periphery of the spring, the axially facing surface of the spring that faces toward the turbine is in contact with the opposite face of the heat shroud 80 that faces away from the turbine. At the radially inner periphery of the spring, the axially facing surface of the spring that faces toward the turbine is in contact with the opposite face of the heat shroud that faces away from the turbine, and the axially facing surface of the spring that faces away from the turbine is in contact with the axial reference surface CAS of the center housing 20. The assembly of the heat shroud and spring is axially compressed between the axial reference surface NAS of the nozzle and the axial reference surface CAS of the center housing, thereby axially locating the nozzle ring relative to the center housing. The spring 90 has the primary duty of biasing the nozzle ring 38 in the axial direction (to the right in FIG. 2), while the heat shroud 80 has the primary duty of shielding the spring and other components from the high-temperature environment of the turbine nozzle.

Thus, at both their radially outer and radially inner peripheral regions, the heat shroud 80 and spring 90 are in contact with each other. However, in between those contact regions, the heat shroud and spring are axially spaced apart, thereby creating a dead space DS within the assembly. The dead space is sealed off from the exhaust gases surrounding the assembly. In the present description and the appended claims, the term "dead space" means that fluid within the space DS is substantially stagnant such that convective heat transfer on the inner surfaces of the walls of the dead space is of negligible significance, or stated differently, there is no means allowing fluid to pass through (enter and then exit) the dead space. Notwithstanding this definition, the term "dead space" does not preclude the possibility of a small opening into the space, since absolutely hermetic sealing of the space is not possible in practice; unintended leakage pathways are always a possibility in practice, particularly in view of thermal deformations that can occur, which could allow communication of fluid pressure between the inside and the outside of the dead space. However, as used herein, "dead space" means that any such opening into the dead space does not result in any significant fluid movement within the dead space.

In accordance with one embodiment of the invention as shown in FIG. 2, the radially outer peripheral region of the heat shroud 80 extends radially inwardly to a first bend B1, at which the heat shroud angles radially inwardly and axially toward the turbine wheel 22 to a second bend B2, at which the heat shroud bends to extend substantially radially inwardly to a third bend B3, at which the heat shroud angles radially inwardly and axially toward the center housing 20 to a fourth bend B4, at which the heat shroud bends to extend radially inwardly, the radially inner peripheral region of the heat shroud being radially inward of the fourth bend. The spring 90 has a generally similar shape, including the same series of bends as the heat shroud, but is closer to being planar than the heat shroud, thereby creating the dead space between the spring and the heat shroud.

Figure 2A:
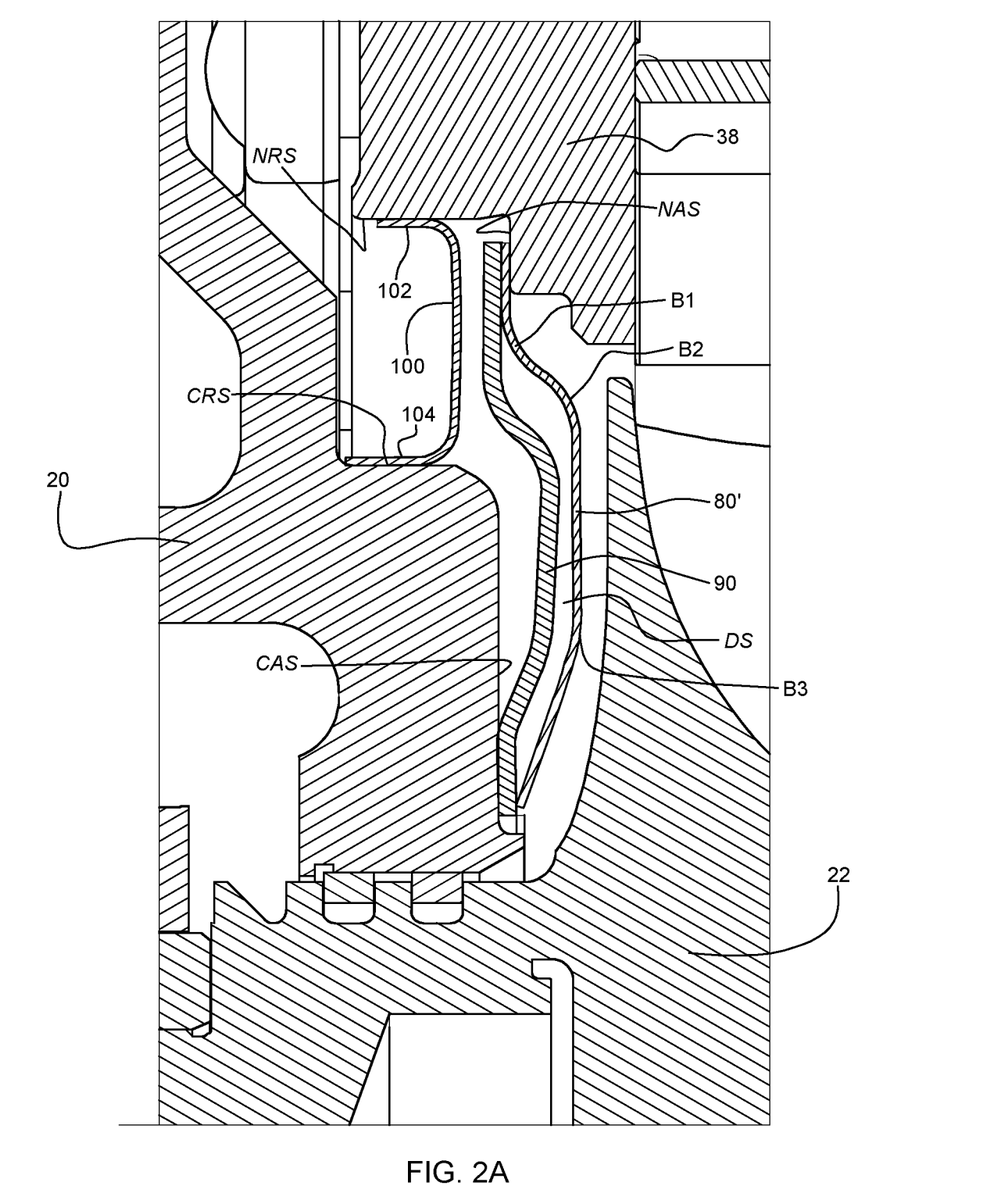
FIG. 2A is similar to FIG. 2, but showing an alternative embodiment of the invention.

An alternative embodiment is shown in FIG. 2A. The spring 90 is the same as in the prior embodiment, but the heat shroud 80' has a different shape from the prior embodiment. Specifically, the heat shroud 80' has the bends B1 through B3, but it lacks the fourth bend B4, and therefore the heat shroud extends substantially linearly from the third bend, radially inwardly and axially toward the center housing. The radially inner end of the heat shroud 80' contacts the spring 90 to substantially seal off the dead space DS.

Finite element analyses (transient thermal analyses and structural analyses) of a turbine generally according to FIGS. 1 and 2 have been conducted to assess the impact of the new heat shroud and spring assembly. The analyses imposed a duty cycle of four successive cycles, in each of which the engine exhaust gas temperature ramped up from 150° C. to 1020° C. in a period of about 10 seconds, remained at the high temperature for approximately 460 seconds, and then ramped down to 300° C. in about 10 seconds, and further ramped down to 150° C. in about 144 seconds, whereupon the next identical duty cycle immediately began again. Three configurations were analyzed: Configuration #1 employed a single spring or shroud (i.e., corresponding to the spring 90 with no additional heat shroud 80); Configuration #2 employed a heat shroud and spring assembly with no dead space between them (i.e., the heat shroud and spring were in contact over their entire faces); Configuration #3 employed a heat shroud and spring assembly having a dead space, generally as shown in FIG. 2.

Figure 3:
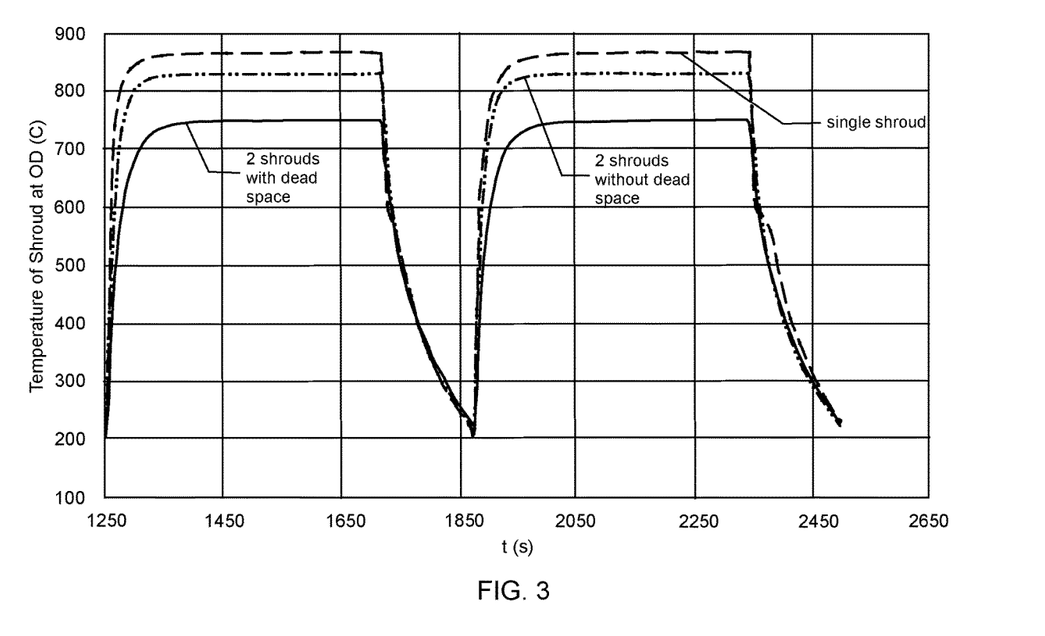
FIG. 3 is a graph showing a comparison of results of finite element thermal analyses of a turbocharger in accordance with an embodiment of the invention as well as turbochargers that do not include the heat shroud and spring assembly of the invention.

FIG. 3 is a plot of the results of the finite element analyses of these three configurations. The vertical axis represents the temperature of the spring 80 at the outer diameter thereof, and the horizontal axis represents time in seconds. FIG. 3 plots the response to the third and fourth duty cycles as described above. The spring OD temperature for Configuration #1 having a single shroud (i.e., having only a spring but no separate heat shroud) reached a maximum of about 869° C. For Configuration #2 having two shrouds (a spring and a heat shroud) with no dead space (i.e., in contact over their entire faces), the maximum spring OD temperature was 833° C. For Configuration #3 having two shrouds (a spring and a heat shroud) with a dead space, generally corresponding to the arrangement in FIG. 2, the maximum spring OD temperature was 750° C. Thus, the design according to an embodiment of the invention enabled a temperature reduction of about 120° C. at the spring OD, which is generally the hottest location of the spring.

While the problems of creep and plasticization noted with prior-art springs could potentially be mitigated by making the spring from special materials made to tolerate extremely high temperatures, such materials are relatively expensive. The invention provides an alternative solution to the problem so that less-expensive conventional materials can be used for the heat shroud, spring, and locator components. Alternatively, if special high-temperature-resistant materials were used for the spring and other parts, then the invention can enable the assembly to function at higher exhaust gas temperatures without experiencing creep and plasticization problems.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger having a variable-nozzle turbine, comprising:
    a turbine assembly comprising a turbine housing and a turbine wheel mounted in the turbine housing and connected to a rotatable shaft for rotation therewith, the turbine housing defining a chamber for receiving exhaust gas and for supplying the exhaust gas to the turbine wheel, the turbine assembly defining a nozzle leading from the chamber radially inwardly to the turbine wheel;
    a compressor assembly comprising a compressor housing and a compressor wheel mounted in the compressor housing and connected to the rotatable shaft for rotation therewith; a center housing connected between the compressor housing and the turbine housing, the center housing defining a radial reference surface that faces radially outwardly and an axial reference surface that faces axially toward the turbine wheel;
    a variable-nozzle cartridge connected between the center housing and the turbine housing and comprising an assembly of an annular nozzle ring and an array of rotatable vanes circumferentially spaced about the nozzle ring and disposed in the nozzle for regulating exhaust gas flow to the turbine wheel, wherein the nozzle ring at a radially inner periphery thereof defines a radial reference surface that faces radially inwardly and opposes the radial reference surface of the center housing, and an axial reference surface that faces axially away from the turbine wheel;
    an insert defining a nozzle portion that is axially spaced from the nozzle ring such that the vanes extend between the nozzle ring and the nozzle portion, a plurality of spacers being connected between the nozzle ring and the nozzle portion of the insert; and
    a heat shroud and spring assembly disposed in a space bounded between the radially inner periphery of the nozzle ring, the turbine wheel, and the center housing, the heat shroud and spring assembly comprising a heat shroud and a spring formed as two discrete parts, the heat shroud comprising an annular non-flat disk-shaped part and the spring comprising an annular non-flat disk-shaped part, the heat shroud and the spring abutting each other at radially outer and radially inner peripheral regions thereof and being spaced apart over an intermediate region between said radially inner and radially outer peripheral regions so as to define a dead space between the heat shroud and the spring that is sealed off from exhaust gases surrounding the heat shroud and spring assembly.

2. The turbocharger of claim 1, wherein the heat shroud at the radially outer peripheral region thereof is in contact with the axial reference surface of the nozzle ring, and the spring at the radially inner peripheral region thereof is in contact with the axial reference surface of the center housing, and wherein the heat shroud and spring assembly is axially compressed between the axial reference surface of the nozzle ring and the axial reference surface of the center housing so as to axially locate the nozzle ring relative to the center housing.

3. The turbocharger of claim 2, further comprising a locator disposed between and in contact with the radial reference surface of the nozzle ring and the radial reference surface of the center housing so as to radially locate the nozzle ring relative to the center housing.

4. The turbocharger of claim 1, wherein the heat shroud is constructed of a first material and the spring is constructed of a second material that differs from the first material.

5. The turbocharger of claim 1, wherein the turbine housing defines an axial bore through which exhaust gas is discharged from the turbine wheel, and the insert further comprises a tubular portion received into the axial bore of the turbine housing, the nozzle portion extending radially out from one end of the tubular portion.

6. The turbocharger of claim 1, wherein the radially outer peripheral region of the heat shroud extends radially inwardly to a first bend, at which the heat shroud angles radially inwardly and axially toward the turbine wheel to a second bend, at which the heat shroud bends to extend substantially radially inwardly to a third bend, at which the heat shroud angles radially inwardly and axially toward the center housing.

7. The turbocharger of claim 6, wherein the spring is closer to being planar than the heat shroud, thereby creating the dead space between the spring and the heat shroud.

* * * * *